Dec. 15, 1942.  J. E. McKEE ET AL  2,304,842
FATTY ACID TREATMENT
Filed June 22, 1939
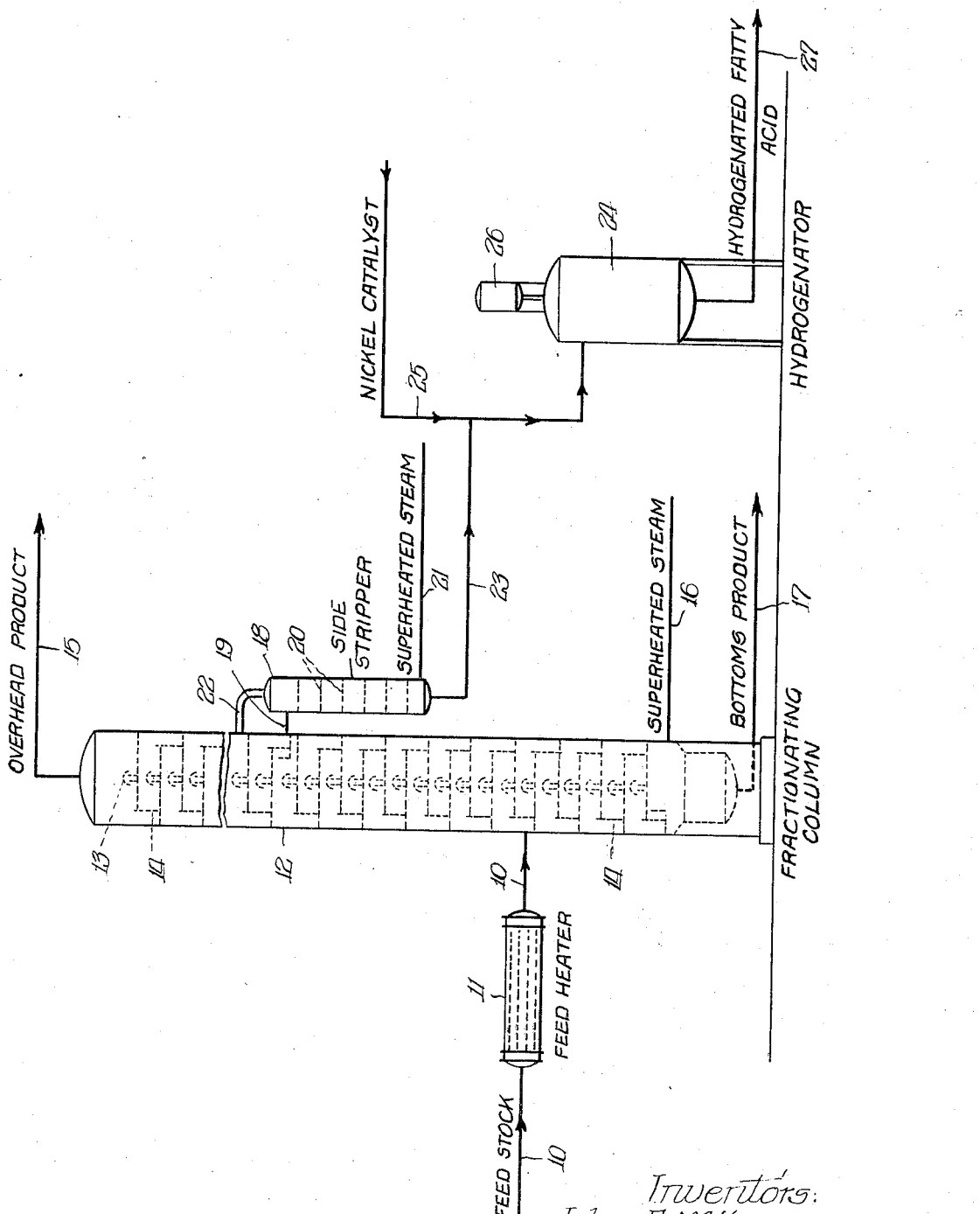
Inventors:
John E. McKee,
Orlando Graziani,
BY Cromwell, Greist & Warden
ATTORNEYS Patented Dec. 15, 1942

2,304,842

UNITED STATES PATENT OFFICE 2,304,842

FATTY ACID TREATMENT

John E. McKee, Western Springs, and Orlando Graziani, Chicago, Ill., assignors to Armour and Company, Chicago, Ill., a corporation of Illinois Application June 22, 1939, Serial No. 280,594

11 Claims. (Cl. 260—409)

The present invention relates to the treatment of triglycerides and their fatty acids and has particular reference to an improved process for increasing the degree of saturation of oils and their fatty acids by hydrogenation.

Triglycerides contain both saturated and unsaturated fatty acid radicals. For many uses it is desirable that the degree of saturation of the fatty acids be increased. The common practice for increasing the saturation of fatty acid radicals is hydrogenation. This procedure involves the well known steps of subjecting the fatty acid radicals, usually in the form of triglycerides, to heat and pressure in the presence of a nickel catalyst. The hydrogenation may be of the triglycerides or of the hydrolyzed fatty acids. In some cases the hydrogenation proceeds without difficulty and relatively little catalyst is necessary for the operation. In other instances, and particularly in the case of fatty acids, the hydrogenation procedure is effected with difficulty, a relatively large amount of catalyst being required to produce an effective reduction of the iodine number of the material. The present invention has for its principal object the effective and economical hydrogenation of this latter type of material which heretofore has been resistant to treatment.

A further object of the invention is the provision of an improved process for treating unsaturated triglyceride oils containing hydrogenation inhibiting factors, which includes hydrolyzing the oils to produce a mixture of volatile fatty acids carrying the hydrogenation inhibiting factors in volatile form, subjecting the fatty acids to fractional distillation, recovering one fatty acid fraction containing the volatile hydrogenation inhibiting factors, recovering a second fatty acid fraction free from these factors, subjecting the latter fraction to hydrogenation, and reacting the hydrogenated fatty acid fraction with glycerine to produce a synthetic triglyceride or with some different material for other purposes.

Another object is the effective hydrogenation of a fatty acid mixture which itself contains volatile hydrogenation inhibiting factors by fractionally distilling the mixture to produce one or more fatty acid fractions containing the inhibiting factors and another fraction which can be hydrogenated with ease.

An additional object of the invention is the provision of a method for producing a saturated fatty acid composition of relatively uniform molecular weight from mixed fatty acids of varying molecular weight and containing unsaturated constituents.

Still another object of the invention is the production of a fatty acid mixture by hydrolyzing a triglyceride, subjecting the fatty acid mixture to a fractionation procedure in which there is produced an overhead product containing low boiling hydrogenation inhibiting factors, a bottom product containing high boiling volatile hydrogenation inhibiting factors, and an intermediate product, and subsequently subjecting the intermediate product to hydrogenation free of these factors, the hydrogenation procedure preferably being conducted with vigorous agitation at a relatively slow and uniform rate as compared with the initial possible hydrogenation rate.

These and other objects of the invention will be observed upon a consideration of the following specification and by reference to the accompanying drawing, in which the single figure is a somewhat diagrammatic view of apparatus suitable for carrying out the improved process.

The invention includes the discovery that the difficulties encountered upon occasions in hydrogenating triglycerides such as vegetable oils, and their fatty acids largely may be overcome by subjecting the material in fatty acid form to fractional distillation prior to hydrogenation to remove volatile hydrogenation inhibiting substances. It is likely that the interference with hydrogenation by vegetable oils and their fatty acids is based upon a "poisoning" of the catalysts employed in the process by volatile impurities which develop in the oil or fatty acids. Nickel is widely used as a catalyst for hydrogenation processes, since it is effective and more economical than platinum. Other metals such as chromium also have been suggested as catalysts in the hydrogenation process. Where the oil or fatty acids are hydrogenation-resistant, the reaction will proceed but the amount of catalyst required is excessive.

Where a triglyceride proves to be hydrogenation-resistant it may be freed of the inhibiting factors after conversion into acid form by a fractional distillation procedure in which inhibiting factors, which are volatile, are isolated into one or more fractions such as the overhead fraction and the high boiling fraction. In the case of such an oil a fatty acid mixture may be produced as by the well known Twitchell method. The splitting operation generally will be effective to hydrolyze approximately 96 per cent of the triglycerides. The particular nature of the fatty acid mixture will depend upon its source. This source may be corn oil, cottonseed oil, soy bean oil, or the like. The fatty acids resulting from hydrolysis of the hydrogenation-resistant vegetable oil may be hydrogenated effectively if first subjected to fractional distillation to eliminate volatile inhibiting factors. The procedure involved in the fractional distillation may be as described in Potts and McKee Patent 2,054,096.

The fatty acid feed stock is passed through line 10 into a feed heater 11, this heater preferably being a tube still in which the temperature of the fatty acid stock is increased sufficiently to provide for fractional distillation. The heated stock then passes into a fractional distillation column indicated at 12.

Within the fractionating column are positioned a series of superimposed bubble trays 13 having capped vapor vents 13 and liquid down spouts 14. The heated fatty acid stock is flashed into the fractionating column and there vaporized. The vaporized fatty acids pass upwardly through a series of zones of liquid fatty acids having decreasing boiling points. From the upper of these zones represented by the bubble trays is taken a vaporous overhead product which is condensed after passing off through line 15. The requisite amount of the condensed overhead product is returned to the upper bubble tray as reflux liquid.

The non-volatile or high boiling constituents of the fatty acid mixture pass downwardly across the bubble trays in the lower portion of the column. Superheated steam is introduced through line 16 in the bottom of the column and passes upwardly therethrough countercurrent to the downward flow of liquid fatty acids. It will be understood that where the mixture entering the tower is not completely hydrolyzed the unsplit triglycerides will flow downwardly to the bottom of the tower against the countercurrent of upwardly rising steam. Thus, in the case of a hydrolyzed oil which has not previously been subjected to distillation, there will be present a small portion of triglycerides which are removed as a bottom product through line 17.

The upwardly rising steam strips volatile products from the downwardly flowing liquid material, and the resulting mixture of steam and vaporous fatty acids pass upwardly in heat exchange contact with the zones of liquid fatty acids.

The heat necessary for fractionation may be supplied by the feed stock and the superheated steam passing through line 16. The bottom product also may be heated and recirculated to provide additional heat.

Intermediate the top and bottom of the fractionating tower is provided a side stripper 18. The stripper 18 takes liquid fatty acids from an intermediate plate in the tower through line 19, this liquid fraction passing downwardly through the perforated plates 20 of the stripper against an upwardly rising flow of superheated steam introduced through the line 21 into the bottom of the stripper. The steam and the lower boiling fatty acids stripped from the liquid fatty acids flowing through the stripper 18 pass back into the tower through the overhead line 22.

The operating conditions of the fractionating procedure will depend upon the particular nature of the fatty acid mixture and upon other factors such as the type of product desired. Normally it is preferred to maintain the fractionation tower under a high vacuum such as may be produced by a jet condenser. The fraction or fractions in which the volatile hydrogenation inhibiting factors are isolated by the fractionation procedure will depend upon such factors as the particular nature of the factors and the type of product desired to be hydrogenated. In many cases the fatty acid mixture will contain both low boiling and high boiling hydrogenation inhibiting factors.

Where the hydrogenation inhibiting factors are removed in the overhead products or in the bottoms, the fractionated fatty acids removed through line 23 are conditioned for hydrogenation. These fractionated fatty acids may be passed into the conventional hydrogenation autoclave indicated at 24 after being admixed with a nickel catalyst passed into line 23 through the line 25.

The procedure by which hydrogenation is effected is quite well known. The catalyst itself may be prepared by reducing nickel formate in the presence of an oil such as tallow, the reduction being effected by heating the mixture to a temperature of about 250° C. The reduced nickel catalyst is in the form of minute particles of active metallic nickel dispersed in the oil vehicle. Other conventional catalysts may be produced by well known methods.

In the autoclave 24 the mixture of fractionated fatty acids and catalysts are subjected to agitation in the presence of an atmosphere of hydrogen introduced from the source 26.

After passing through the hydrogenation autoclave 24 the fatty acids are withdrawn through the line 27. In some cases it will be found desirable to employ a series of hydrogenators. That is, the product passing through line 27 may be then passed through a further hydrogenation apparatus to increase the degree of saturation. This repetition of the hydrogenation process is less necessary in the case of a fractionated fatty acid composition than in the case of an unfractionated fatty acid composition containing hydrogenation inhibiting factors, due to the increased efficiency of the hydrogenation of the fractionated material.

By the combined fractionation and hydrogenation procedures it is possible to produce special compositions or relatively pure chemical compounds. For example, it is possible to treat impure cottenseed fatty acids in accordance with the combined procedure in which an intermediate fraction is produced consisting of a mixture of linoleic and oleic acids and this mixture is completely hydrogenated to produce relatively pure stearic acid. This product is to be compared with the ordinary stearic acid of commerce which is a mixture of approximately 60 per cent palmitic acid and 40 per cent stearic acid.

In another example of the process palm oil can be hydrolyzed and the resulting fatty acid composition subjected to fractionation to produce a composition containing 90 per cent palmitic acid and 10 per cent unsaturated acids. The fractionated composition then can be hydrogenated to convert the unsaturated acids to stearic acid, so that the hydrogenated mixture will contain about 90 per cent palmitic acid and 10 per cent stearic acid. For all practical purposes this is equivalent to pure palmitic acid.

In the manufacture of soap it often is desirable to increase the degree of saturation of certain of the fatty acid constituents. This conversion of the fatty acids is practical where the acids are initially subjected to a fractional distillation procedure to eliminate the hydrogenation inhibiting factor of the original fatty acid mixture.

A desirable soap may be made by subjecting a black fatty acid stock containing 80 per cent fatty acids and 20 per cent oil to fractionation to produce a special fatty acid composition free from hydrogenation inhibiting factors and a bottom product containing the unsplit oil and unsaponifiable constituents of the original mixture. After hydrogenation the special fatty acid composition is ready for saponification. The bottoms containing 8 to 15 per cent unsaponifiable substances may be split and distilled to provide a volatile portion and pitch. The volatile portion, which may contain 1 per cent unsaponifiable substances, then is subjected to fractionation to produce an acid fraction and a bottom product containing high boiling fatty acids and a relatively large percentage of unsaponifiable substances. The bottom product may be discarded or used for any desired purpose, while the fractionated acids free of the hydrogenation inhibiting factors contained in the bottom product may be subjected to hydrogenation and subsequently used in the production of soap or other compounds.

In each of the examples specified the success of the process depends upon removing the hydrogenation inhibiting factors of the original fatty acid mixture by fractionation prior to the hydrogenation step. Although the undesirable constituents in so far as the hydrogenation procedure is concerned are volatile, the constituents may be fractionated out of the original mixture.

For the purpose of fractionating out the hydrogenation inhibiting portion of the fatty acid mixture the proper number of bubble trays are provided in the tower, the exact number being influenced in many cases by the desire for producing a special composition for particular purposes. In any case there is produced such a separation as will provide a bottom product, an overhead product which is returned in part as reflux liquid and a fraction which is free from the hydrogenation inhibiting constituents of the original fatty acid mixture.

The factors which inhibit hydrogenation apparently are complex in nature. In certain fatty acid mixtures the inhibiting factor will be isolated in the low boiling or overhead fraction, while in other instances the inhibiting factors will be found in a high boiling fraction or bottom product. Often both the overhead and bottoms may contain the inhibiting factors while the intermediate fractions will be found free of the inhibiting factors and easily hydrogenated. The common characteristic of fatty acid mixtures containing hydrogenation inhibiting factors is that they may be divided by fractional distillation into a fraction containing the inhibiting factors and a fraction which is free of these factors.

After the fractionation and hydrogenation, the hydrogenated fatty acids may be re-esterified by ordinary methods to produce synthetic mono, di, or triglycerides having special characteristics not possessed by the original triglyceride from which the fatty acid components were derived. Thus, esters of uniform molecular weight may be produced from mixed acids containing both saturated and unsaturated constituents. Glycerides of a single acid may be produced economically.

It will be recognized that the operating details of the fractionation procedure, as well as the hydrogenation procedure, may be varied widely without departing from the scope of the invention as defined in the appended claims.

We claim:

1. The process which comprises subjecting a mixture of fatty acids containing unsaturated constituents to fractional distillation to produce a volatile bottom fraction containing a hydrogenation inhibiting factor, a volatile overhead fraction containing a hydrogenation inhibiting factor, and a volatile intermediate fraction containing unsaturated fatty acids, and subjecting the intermediate fraction to hydrogenation.

2. The process of treating a vegetable triglyceride containing an hydrogenation inhibiting factor, which comprises subjecting the triglyceride to hydrolysis to produce a mixture of fatty acids containing said hydrogenation inhibiting factor and unsaturated fatty acids, subjecting said mixture to fractional distillation to produce a volatile overhead fraction containing said factor and another unsaturated fatty acid-containing fraction, and subjecting said unsaturated fatty acid-containing fraction to hydrogenation.

3. The process which comprises subjecting a triglyceride containing unsaturated fatty acid constituents and a volatile hydrogenation inhibiting factor to hydrolysis to produce a mixture containing a triglyceride, said hydrogenation inhibiting factor and unsaturated fatty acids, subjecting said mixture to fractional distillation to produce a bottom fraction containing said triglyceride, volatile high boiling fatty acids, and said hydrogenation inhibiting factor, and a fatty acid fraction containing unsaturated fatty acids, and subjecting said fatty acid fraction to hydrogenation in the presence of a metallic catalyst.

4. The process which comprises subjecting a triglyceride to hydrolysis to produce a mixture containing triglycerides, a hydrogenation inhibiting factor, and saturated and unsaturated fatty acids, passing said mixture through a continuous heater to raise the temperature thereof sufficiently for distillation of said fatty acids, passing the heated mixture into a vaporization zone, passing the resulting vapors upwardly through a series of zones of liquid fatty acids having decreasing boiling points, condensing fatty acid vapors from the upper of said zones, returning at least a portion of the condensed material to the upper of said zones as reflux liquid, withdrawing a bottom product containing said triglycerides and a hydrogenation inhibiting factor, withdrawing an intermediate fraction containing unsaturated fatty acids, withdrawing an overhead fraction containing a hydrogenation inhibiting factor, and subjecting said unsaturated fatty acids to hydrogenation in the presence of a nickel catalyst.

5. The process which comprises subjecting a triglyceride to hydrolysis to produce a mixture containing triglyceride, a hydrogenation inhibiting factor, and saturated and unsaturated fatty acids, subjecting said mixture to fractional distillation to produce an overhead volatile fraction containing said hydrogenation inhibiting factor and low boiling fatty acids, and another fraction containing the unsaturated fatty acids, said last-mentioned fraction being substantially free of the hydrogenation inhibiting factor, the boiling points of the bulk of the substances in said last-mentioned fraction being substantially above those of the bulk of the substances in the overhead fraction, and subjecting the fraction containing the unsaturated fatty acids to hydrogenation in the presence of a metallic catalyst.

6. The process which comprises subjecting a triglyceride to hydrolysis to produce a mixture containing triglyceride, hydrogenation inhibiting factors, and saturated and unsaturated fatty acids, subjecting said mixture to fractional distillation to produce an overhead volatile fraction containing one of said hydrogenation inhibiting factors and low boiling fatty acids, an intermediate volatile fraction containing the unsaturated fatty acids and being substantially free of hydrogenation inhibiting factors, the boiling points of the bulk of the substances in the intermediate fraction being substantially above those in the overhead fraction, and a volatile bottom fraction containing one of said hydrogenation inhibiting factors and high boiling fatty acids, the boiling points of the bulk of the substances in said bottom fraction being substantially above the boiling points of the bulk of the substances in the intermediate fraction, and subjecting said intermediate fraction to hydrogenation in the presence of a metallic catalyst.

7. The process of treating a fatty acid mixture derived from a triglyceride oil and containing unsaturated fatty acids and hydrogenation inhibiting factors which comprises subjecting said fatty acid mixture to fractional distillation to produce an upper volatile fraction containing one of said hydrogenation inhibiting factors and a lower volatile fraction containing another of said hydrogenation inhibiting factors and an intermediate volatile fraction containing unsaturated fatty acids and being substantially free of said hydrogenation inhibiting factors, and subjecting said intermediate volatile fraction to hydrogenation.

8. The process of treating a mixture of fatty acids derived from a triglyceride oil and containing unsaturated fatty acids and hydrogenation inhibiting factors, which comprises subjecting said mixture of fatty acids to fractional distillation to produce an upper volatile fraction which contains one of said hydrogenation inhibiting factors and a lower volatile fraction which contains another of said hydrogenation inhibiting factors and an intermediate volatile fraction containing unsaturated acids and being substantially free of said hydrogenation inhibiting factors, the boiling points of the bulk of the substances in each of the said fractions being substantially different, and subjecting said intermediate volatile fraction to hydrogenation to produce a synthetic composition of relatively uniform molecular weight.

9. A process as called for in claim 7 in which said mixture is derived from cottonseed oil.

10. A process as called for in claim 7 in which said mixture is derived from soy bean oil.

11. A process as called for in claim 7 in which said lower volatile fraction is contained along with glycerides in a bottoms product.

JOHN E. McKEE.
ORLANDO GRAZIANI.